Figure 1:
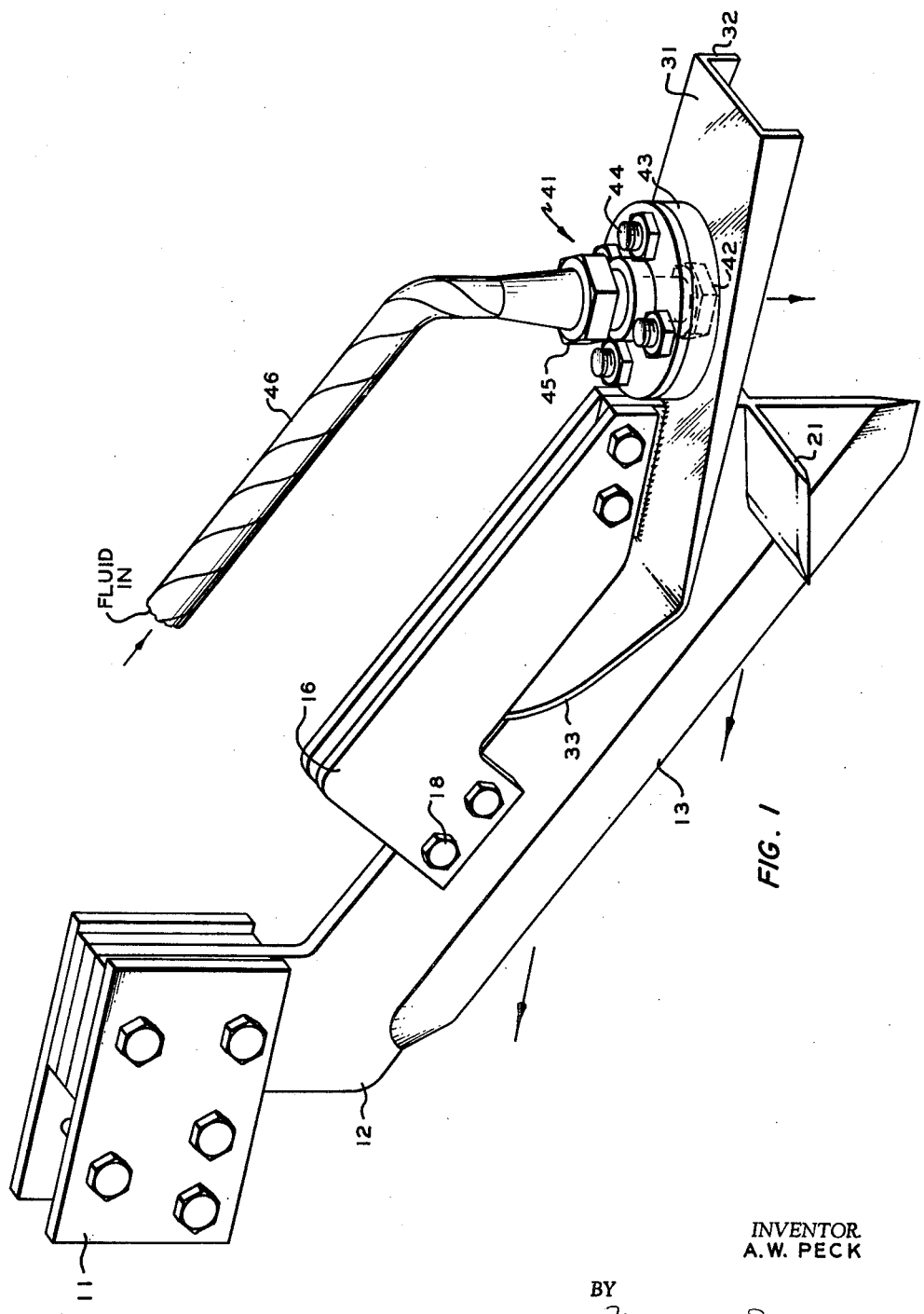

June 15, 1965  A. W. PECK  3,188,988
APPARATUS FOR APPLYING AGRICULTURAL CHEMICALS TO THE SOIL
Filed Nov. 16, 1962  2 Sheets-Sheet 1

INVENTOR.
A.W. PECK
BY
*Young - Lugg*
ATTORNEYS

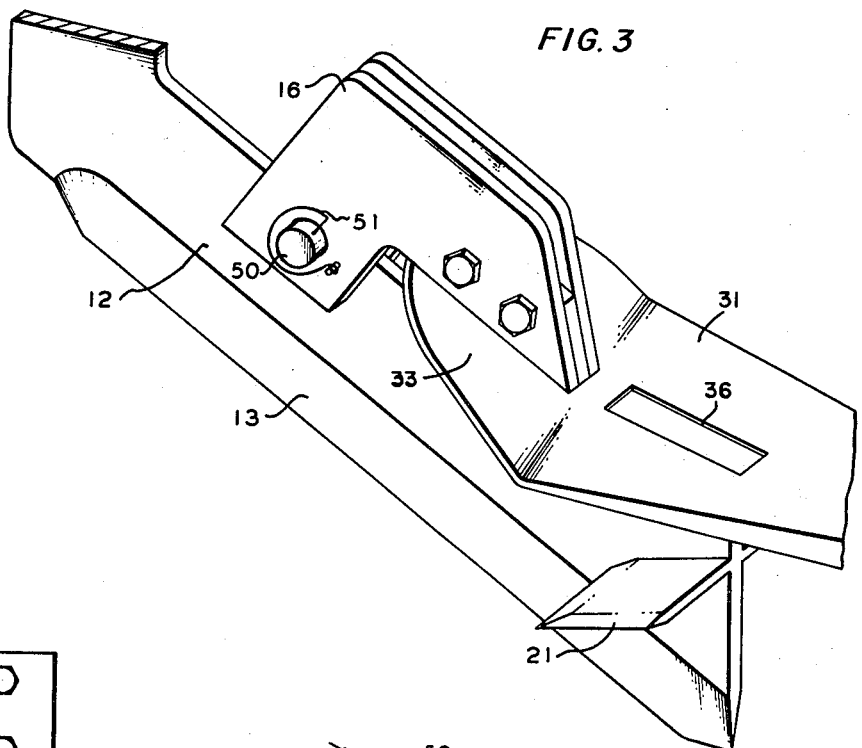
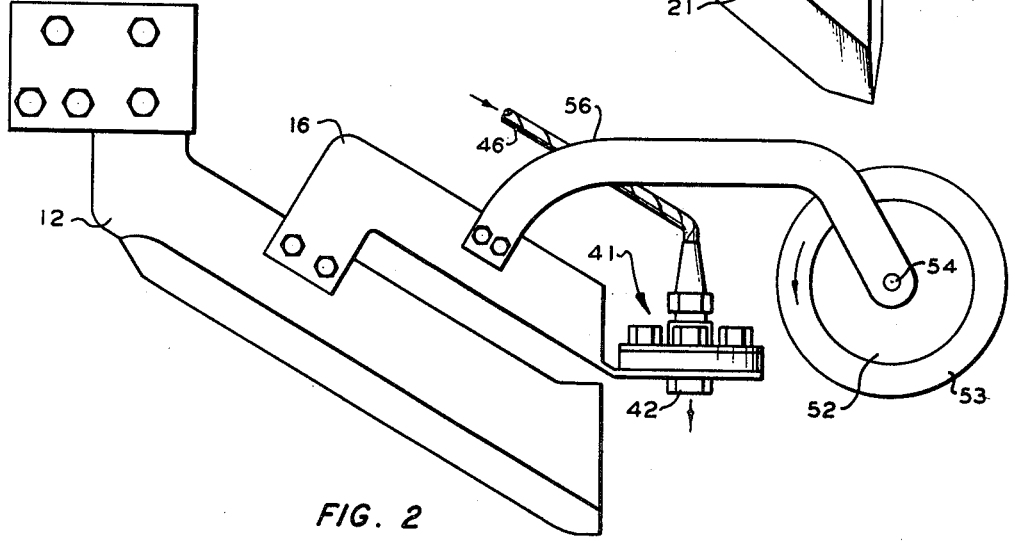

United States Patent Office 3,188,988
Patented June 15, 1965

3,188,988
APPARATUS FOR APPLYING AGRICULTURAL CHEMICALS TO THE SOIL
Alvin Wayne Peck, Bartlesville, Okla., assignor to Phillips Petroleum Company, a corporation of Delaware
Filed Nov. 16, 1962, Ser. No. 238,112
6 Claims. (Cl. 111—7)

This invention relates to the application of fluids to soil. In one of its aspects, the invention relates to method and apparatus for applying normally gaseous fluids to the sub-surface of soil. In another of its aspects the invention relates to method and apparatus for applying fertilizer to the sub-surface of soil and compacting the soil after the application to insure its retention.

It has long been considered desirable to top dress or side dress small grains and pasture grasses with fertilizers such as anhydrous ammonia and/or to apply nematocides, insecticides, and other agricultural chemicals to the sub-surface of the soil in such crops. Such practice has not been widely accepted for a number of reasons. Grasses and small grains frequently develop a heavy root system and application of chemicals in the interval of five to eight inches below the surface of the ground may require high power equipment to draw the applicator through the soil. Additionally, the plant roots may be damaged by any applicator that is drawn through the soil, and many farmers are reluctant to apply chemicals to any crop where such damage is apparent upon application of the chemical. Where normally gaseous chemicals are applied under pressure, release of the pressure through the nozzle of the applicator may result in a marked reduction in temperature of the nozzle and associated parts of the applicator. In most prior art applicators, the nozzle is placed beneath the surface of the soil and the reduction of temperature frequently results in freezing of moist soil with a resultant buildup of the frozen soil on the applicator. The buildup of frozen soil in effect, enlarges the applicator so that in some instances a rather large and bulky assembly of applicator and soil is drawn through the soil. This again increases power requirements and also increases damage to the plant roots. Whenever a large furrow or ditch is opened by the applicator, gaseous chemicals can escape from the ditch and there is less benefit from the application than had been intended.

It is an object of this invention to provide method and apparatus for applying fluids to soil. It is another object of this invention to provide method and apparatus for applying agricultural chemicals to the sub-surface of soil with minimum damage to the soil and/or growing crop. It is a further object of this invention to apply to soil agricultural chemicals with minimum power requirements to the machinery drawing the applictor. It is a further object of the invention to provide method and apparatus for applying agricultural chemicals to the sub-surface of the soil with minimum escape of the chemicals after application. It is a further object of the invention to apply agricultural chemicals to the sub-surface of the soil in such a manner as to contact a maximum amount of soil at the instant of application. It is a still further object of the invention to provide a method and apparatus for applying agricultural chemicals to the sub-surface of the soil without freezing of the soil in such a fashion as to cause it to adhere to the applicator. A still further object of the invention is to provide a method and apparatus for making an opening in the soil, applying a fluid thereinto, and then closing the opening in the soil.

Others aspects, objects and the several advantages of this invention will be apparent to one skilled in the art upon study of this disclosure, drawing, and the appended claims to the invention.

According to the invention, there is provided a method for parting the soil in a shallow furrow or ditch, projecting an agricultural chemical into the furrow from above the surface of the soil, closing the soil after application of the chemical and compacting the soil to prevent escape of the fluid.

Also, according to the invention, there is provided an applicator comprising a swept back parting knife for cutting a furrow in the soil, a nozzle, positioned near the trailing edge of the parting knife, positioned above the top surface of the soil so that the nozzle projects chemical into the furrow cut by the parting knife, and a smoothing blade, immediately behind the nozzle for pulling soil into the furrow and compacting it slightly. Additionally, there may be provided on the parting knife horizontal blades preferably but not necessarily positioned behind the leading edge of the parting knife and at a distance below the surface of the ground to open a horizontal cavity in the sub-soil to increase the area contacted by the fluid at the time of injection.

Further, according to the invention, there is provided apparatus for parting the soil, projecting agricultural chemical into the parted soil, and closing and compacting by wheel means which trails closely behind the parting means.

In the accompanying drawings, FIGURE 1 is an isometric view of a preferred form of the applicator, FIGURE 2 illustrates the apparatus with a different form of compactor, and FIGURE 3 shows the applicator with a modified form of the compactor of FIGURE 1.

Referring now to FIGURE 1, the applicator is attached to a conventional spring tine applicator which is mounted on a farm vehicle, such as a tractor. The apparatus is attached to the spring tine by means of a pair of plates 11, and suitable bolts. Depending from the point of attachment is a swept back parting knife 12, which has a sharpened leading edge 13. The trailing edge of parting knife 12 is flat and essentially vertical. The blade is approximately ⅜ to 1 inch in thickness. Attached to parting knife 12 are a pair of essentially horizontal blades 21. Blades 21 are attached back of the leading edge 13 of parting knife 12 so that blades 21 will be self-cleaning of roots and debris. Blades 21, desirably, are tilted slightly from the horizontal so that the leading edge of these blades are below the trailing edge. This serves the dual purpose of helping to hold the parting knife at the desired level in the ground and of producing a slight cavity within the sub-soil as the apparatus is drawn through it.

A nozzle and smoothing blade mount are provided by bracket 16, which is attached by means of bolts 18 to the parting knife at the approximate mid-point of the parting knife. Attached to bracket 16 is a smoothing blade 31. Smoothing blade 31 is provided with side wings 32. Side wings 32 are tapered from zero thickness at the front, to maximum thickness at the rear. Usually, the maximum thickness for side wings 32 is of the order of one inch. Smoothing blade 31 and side wings 32 draw the soil back in the furrow after it is opened by parting knife 12 and compact the soil slightly at the same time. Smoothing blade 31 is conveniently of three to four inches in width and six to eight inches in length, although other dimensions may be used if desired.

Attached to the forward edge of smoothing blade 31 is an upswept deflector 33 which forces any soil turned upwardly by parting blade 12 in a downward direction so that it will pass under compacting blade 31. It is to be noted that side wings 32 are not parallel, but that the leading edge is spaced more widely than the trailing edge so that side wings 32 pull any loose soil inwardly in order to better fill the furrow and aid in compacting the soil in the furrow after the application of the agricultural chemical.

Positioned at the approximate midpoint of smoothing blade 31 is the chemical injection or projecting assembly 41. Injection assembly 41 comprises a nozzle 42, mounting plate 43, mounting bolts and nuts 44, and conduit fitting 45. Agricultural chemical is supplied to the injector assembly by means of conduit 46. Nozzle 42 is so mounted on smoothing blade 31, that it is positioned at or above the normal surface of the soil. Being positioned immediately behind the trailing edge of parting knife 12, nozzle 42 is thus arranged to project agricultural chemical into the furrow created by blade 12 before the furrow is closed by the smoothing blade or, as shown in FIGURE 2, by the smoothing wheel. In this manner the agricultural chemical is projected into the furrow and the furrow closed almost instantly thereafter.

The apparatus as illustrated in FIGURE 2 is similar to that of FIGURE 1, excepting that a wheel is used for compacting the soil. Identical parts have been given the same numbers as that for FIGURE 1. Instead of a smoothing blade, there is provided a compacting wheel 52 which will be provided with an outer rim 53. Conveniently, this may take the form of a semi-pneumatic tire and preferably the tire will have a concave tread portion which will serve to pull the soil into and compact over the furrow. The rim or tire, of course, could be made of other materials, such as steel. The compacting wheel is supported by an arm 51 which is attached to bracket 16, is indicated. An axle 54 is provided for mounting the wheel on the supporting arm. Supporting arm 51 may be a flat spring for urging the wheel into contact with the soil.

FIGURE 2 is also different in that horizontal blades 21 are omitted.

In some types of soil, especially rough and uneven soil, it may happen that the knife blade 12 will not have a constant penetration into the soil. This can be caused by the fact that blade 21 causes the assembly to travel in an essentially straight path whereas the surface of the soil is in itself not a straight or smooth surface. In such event, all portions of the apparatus will function as heretofore described, excepting that the smoothing blade 31 may from time to time fail to contact the soil. This can be overcome readily by the modification shown in FIGURE 3. Arm 16, which supports smoothing blade 31, is mounted on parting knife 12 by means of pivot pin 50. Coil spring 51 is attached to pin 50 and arm 16 so that blade 31 is urged downwardly at all times. Also, blade 31 is provided with a slot 36 above the trailing edge of knife 12 so that blade 31 can be lowered by spring action to within about one inch of the lowermost edge of the knife. Thus, even in rough or uneven soil, the blade 31 will always be in contact with the soil and will close the furrow following the parting of same by knife 12. In a similar fashion, arm 56 shown in FIGURE 2, can be of spring steel to perform this same function.

The novel applicator described in the preceding paragraphs will provide more satisfactory application of agricultural chemicals to growing crops than has been possible with prior art devices. For example, freezing is reduced or largely eliminated due to the fact that the nozzle assembly is essentially all above the surface of the ground and is warmed by the surrounding atmosphere. Additionally, the nozzle is attached to a relatively large metallic plate which will serve as a heat source to aid in melting any frost or ice that might form during normal operation. Power requirements for drawing the apparatus through the soil will be greatly reduced because there will be no accumulation of frozen soil on the apparatus and the apparatus is so designed that it will not cut a deep furrow in the soil. Moreover, the apparatus will contact a large amount of surface because of the side wings 21 which have been provided to cut a horizontal furrow in the sub-soil.

Reasonable variation and modification are possible within the scope of the foregoing disclosure, drawing and the appended claims to this invention the essence of which is that there are provided a method and apparatus for applying fluids, e.g., agricultural chemicals, to the sub-surface of soil, especially near growing crops, wherein a furrow in the soil is created by a blade and fluid or agricultural chemical is projected into said furrow from a point at or above the surface of the soil in such fashion minimizing freezing due to cooling effect of the expanding gases, still, at the same time, to contact a maximum volume of soil during the application of the chemical. Moreover, means are provided by wheel or smoothing blade for pulling soil into the furrow or ditch to close the furrow or ditch and prevent escape of the injected fluid. It is understood, of course, that a plurality of the apparatus, disclosed herein, can be mounted behind a single vehicle to apply agricultural chemical to a plurality of rows at one time.

I claim:

1. Apparatus for applying a fluid to the sub-surface of soil comprising:
   (a) a back swept soil parting knife,
   (b) an upswept deflector,
   (c) a hinge means comprising a bracket and hinge pin connecting the said deflector to an upper portion of said knife,
   (d) a soil smoothing blade attached to the said deflector,
   (e) a conduit for supplying a normally gaseous fluid under pressure to said apparatus, and
   (f) a nozzle for projecting said fluid into the soil mounted on said blade and extending therethrough, the lowermost portion of said nozzle terminating at the lowermost surface of said blade and adjacent the trailing edge of said knife, said nozzle also being in communication with said conduit.

2. Apparatus according to claim 1 wherein there is further provided biasing means for urging the said deflector and smoothing blade downwardly against the soil.

3. Apparatus according to claim 2 wherein the said soil parting knife is further provided with an essentially horizontally disposed blade, said horizontally disposed blade being positioned adjacent the trailing edge of said knife and tilted downwardly whereby to assist in forcing said soil parting knife into the soil as said apparatus is drawn therethrough.

4. Apparatus according to claim 2 wherein the said soil smoothing blade is further provided with at least one side wing, said side wing being adapted to sweep soil back into a furrow.

5. Apparatus for applying a normally gaseous fluid under pressure to the sub-surface of soil comprising:
   (a) a swept back, narrow soil parting knife having a sharpened leading edge and being adapted to open a narrow slit in the soil;
   (b) a pair of horizontal extensions attached to said knife adjacent the trailing edge thereof, the said extensions being tilted slightly downward whereby to open a horizontal slot beneath the surface of said soil and to aid in drawing said knife downwardly;
   (c) a soil smoothing and compacting blade attached by bracket means to an upper portion of said knife, said blade being provided at a leading edge with an upswept deflector portion and along its sides with downwardly extending and rearwardly tapered side wings for drawing soil over the slit in the soil and for compacting same to prevent escape of a gaseous fluid injected into said slit, said blade being positioned generally above the upper side of said knife and having a portion extending beyond the trailing edge of said knife;

(d) a conduit for supplying a normally gaseous fluid under pressure to said apparatus, and (e) nozzle means mounted on said blade adjacent the trailing edge of said knife, said nozzle means being adapted to project said fluid into said slit from a point above the surface of the soil.

6. Apparatus according to claim 5 wherein the said smoothing and compacting blade is provided with a slotted portion adapted to register with the trailing edge portion of said knife and the said bracket is pivotally mounted on said knife whereby the said blade can move vertically with respect to said knife to maintain pressure on said soil even when the upper surface of said soil is uneven.

References Cited by the Examiner

UNITED STATES PATENTS

| | | | |
|---|---|---|---|
| Re. 25,307 | 12/62 | Johnston | 111—6 |
| 183,947 | 10/76 | Lewis | 111—85 |
| 309,403 | 12/84 | Otstot | 111—85 |
| 2,515,317 | 7/50 | Schindler | 111—7 |
| 2,598,121 | 5/52 | Hannibal | 111—7 |
| 2,646,012 | 7/53 | Ingalls | 111—7 |
| 2,722,902 | 11/55 | Hyatt | 111—7 |
| 2,731,928 | 1/56 | Jackson | 111—7 |
| 2,736,279 | 2/56 | Johnston | 111—7 |
| 2,802,435 | 8/57 | Maxwell | 111—7 |
| 2,849,969 | 9/58 | Taylor | 111—7 |
| 2,859,718 | 11/58 | Barkley | 111—7 |
| 2,912,944 | 11/59 | Snow | 111—7 |

FOREIGN PATENTS

| | | |
|---|---|---|
| 1,210,104 | 9/59 | France. |
| 246,766 | 5/12 | Germany. |
| 71,746 | 3/47 | Norway. |

OTHER REFERENCES

"Pub." Operator's Manual (OM–N35–256), John Deere, 930 Series NH$_3$ Applicator, received U.S. Patent Office, April 27, 1956; pp. 18 and 19 relied upon.

ABRAHAM G. STONE, *Primary Examiner.*

WILLIAM A. SMITH, III, *Examiner.*